Jan. 30, 1962  C. A. SOMVILLE  3,018,861
DEVICE FOR ASSEMBLING AND/OR FIXING
ELEMENTS OF METAL FRAMES
Filed Dec. 9, 1958  3 Sheets-Sheet 1
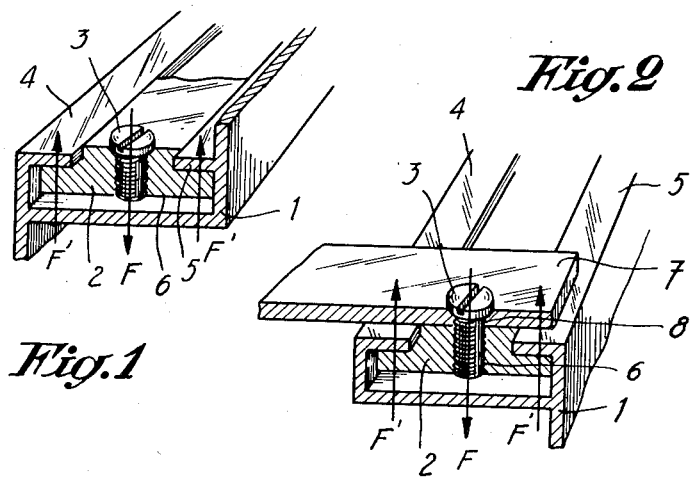
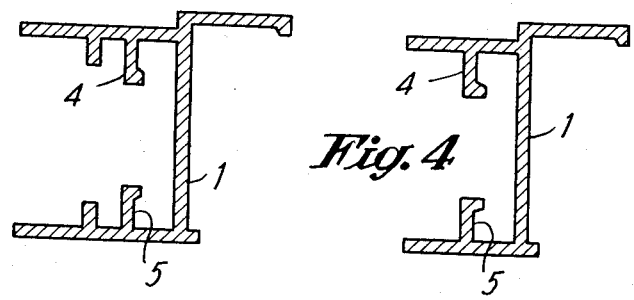
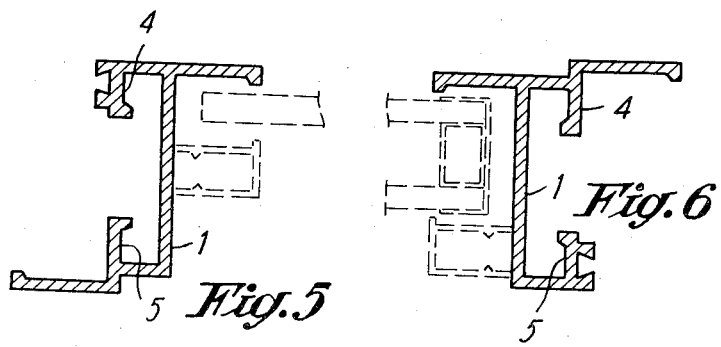
CHARLES A SOMVILLE
INVENTOR
PER Richards & Geier
ATTORNEYS CHARLES A SOMVILLE
INVENTOR
PER Richards & Geier
ATTORNEYS Jan. 30, 1962 C. A. SOMVILLE 3,018,861
DEVICE FOR ASSEMBLING AND/OR FIXING
ELEMENTS OF METAL FRAMES
Filed Dec. 9, 1958 3 Sheets-Sheet 3

CHARLES A. SOMVILLE.
INVENTOR
PER Richards & Geier
ATTORNEYS

United States Patent Office 3,018,861
Patented Jan. 30, 1962

3,018,861
DEVICE FOR ASSEMBLING AND/OR FIXING ELEMENTS OF METAL FRAMES
Charles A. Somville, Burcht, Belgium, assignor to A.V.R., Achat, Ventes, Representations, Societe Anonyme, Brussels, Belgium
Filed Dec. 9, 1958, Ser. No. 779,217
Claims priority, application Belgium Mar. 31, 1958
1 Claim. (Cl. 189—36)

In the construction technique of metal frames, the means used for assembling the parts thereof, and whether these parts be dormant or opening, as well as the means used for attaching separate parts onto or into aforesaid frames are fraught with very serious drawbacks.

In the work of assembling, it is common practice to apply either soldering methods, screwed connections or stamping methods in which the underlying material is driven-in; for fixing separate elements onto the frames, use is generally made of screwed connections.

Soldering of metal frames and more especially of aluminium frames meets with considerable technical difficulties and requires the use of specialized and comparatively very costly industrial equipment.

All those who are conversant with the craft are well aware of the drawbacks attending soldered joints on comparatively thin aluminium parts if such joints have to be made on an industrial scale, i.e. under acceptable conditions of economical efficiency.

Apart from the difficulties encountered in making neat and sightly joints, the latter very often lack homogeneity and are frequently marred by faults and tears.

The use of screwed connections in the actual construction of the frames as well as for attaching separate elements to the latter is attended by drawbacks which are incompatible with the requirements of modern industrial construction with respect to such factors as safety, speed, reduction of specialized labour and low cost.

Now, screwed connections require numerous preliminary operations, such as tracing, drilling and tapping. Reliable screwing in thin or comparatively soft walls requires the use of either sunk bushings with screw inserts or of self-tapping elements.

Tracing operations constitute one of the main burdens of the work, as the accuracy of the latter is wholly dependent on the skill and painstaking of the craftsman engaged on the job. Any tracing fault involves either serious difficulties when assembling the parts or may even make such assembly altogether impossible, and will at any rate require subsequent corrections and give rise to considerable waste.

Drilling, tapping and use of auxiliary elements for taking care of thin aluminium sheets and of the low resistance of aluminium sections involve considerable labour and thus increase the manufacturing costs.

The present invention concerns new means both for assembling constituent parts of frames and for attaching separate parts to the latter. These means systematically do away with the drawbacks attending the soldering process and the known means of assembly by screwing. More particularly, with special reference to the latter, the means set-out in the present invention are such that preliminary tracing is rendered unnecessary and that all drilling and tapping of the constituent parts of the frames are systematically eliminated.

On the other hand, the means according to the present invention consist of devices all components of which can be altogether accurately prefabricated without special or costly industrial equipment, and the actual assembling and fixing procedures requiring in fact no skilled nor specialized labour.

This new system for assembling and/or fixing is essentially characterized by the fact that it consists of a combination of the following parts: a shaped rail or channel which is, at least in part, a semi-tubular cross-section; a pressure element introduced into aforesaid semi-tubular element; and, between aforesaid pressure element on the one hand and aforesaid semi-tubular part on the other hand, a pressure device for applying firmly aforesaid pressure-element against the corresponding part of the re-entrant wings provided on aforesaid semi-tubular part.

Such pressure device may be integral either with an assembling device or with the device used for fixing a separate part onto the frame.

The term "semi-tubular" rail or channel, is to be understood as meaning a hollow rail or channel the cross-section of which is entirely closed except on one of its faces where it has two re-entrant wings; the term "re-entrant wings" should be understood as meaning two wings pointing towards each other.

This semi-tubular cross-section may extend either over the whole length of the shaped rail or channel or only over part of same, in which case all other parts may have any shape whatever, i.e. may either be tubular, semi-tubular, straight or of any other form.

The pressure-device, which will hereafter be called the shoe, may be any part which is either straight, curved or shaped to fit the work on hand, the cross-section of such parts being such as to make it possible to introduce them into the shaped part of the semi-tubular channel or rail. In most cases they will be provided with tapped screw-holes for making it possible to apply the means for exerting pressure. The separate parts which are to be attached to the frame by means of the fixing device according to the invention may also be any shape and used for any purpose whatever, such as serving as parts of hinges, for instance.

As a means for exerting pressure, good use can be made of screws engaging the tapped holes of the pressure shoes, these screws going right through aforesaid shoes and setting-up between the latter and the re-entrant wings of the semi-tubular rails or channels, a pressure stress which may be very large.

More especially for the shoes which are part of an assembling device, aforesaid screws will be made to go right through aforesaid shoes, between the re-entrant wings of the semi-tubular parts of the rails or channels, aforesaid screws using as a fulcrum the bottom of the rails and thus acting by reaction so that aforesaid shoes when used as assembling parts are being applied with considerable force against the re-entrant wings of the rail. In connection with this kind of application, there may be an advantage in making the free end of the screws of conical shape so as to penetrate partly into the metal of the bottom and forming therein dents which will help to secure aforesaid pressure and assembling shoes in their proper locations.

For attaching separate elements to such frames made of channels or rails which are semi-tubular at least in parts, the same means can be used as was described in connection with the assembling procedure, in which case the separate parts may be put right on top of the shoe so as to rest on the outside of the re-entrant wings of the semi-tubular channel, a plain hole being provided in the separate part and aligned with the tapped hole in the shoe. In this arrangement, the pressure screws, instead of bearing against the bottom of the semi-tubular rail, pull the superposed parts together by bearing with their heads against the top of the separate part, thus causing the re-entrant wings to be firmly clamped between the latter and the shoe.

These pressure shoes, whether used for assembling or for fixing, may be given any appropriate shape and dimensions and may also be applied as such or combined with known means. The bearing surfaces of such pressure shoes may be either flat or shaped. They could also be provided with hollowed parts into which the formed adjacent parts of the channel might engage. There may also be an advantage in providing some salient parts on some or all of the faces of the shoe which come into contact with the channel, such as small ribs for instance.

Any further auxiliary means or elements might also be used in conjunction with the means and devices according to the present invention.

It is thus without implying any limitation, that the following embodiments are described in further detail below merely by way of example, with reference to the appended drawings, of which:

FIGURE 1 is a schematic, perspective representation with partial cross-section of the assembling device according to the invention;

FIGURE 2 is a schematic, perspective representation with partial cross-section, of the application of this assembling device as fixing device;

FIGURES 3, 4, 5 and 6 represent by way of example cross-sections of semi-tubular channels or rails;

Figure 7:
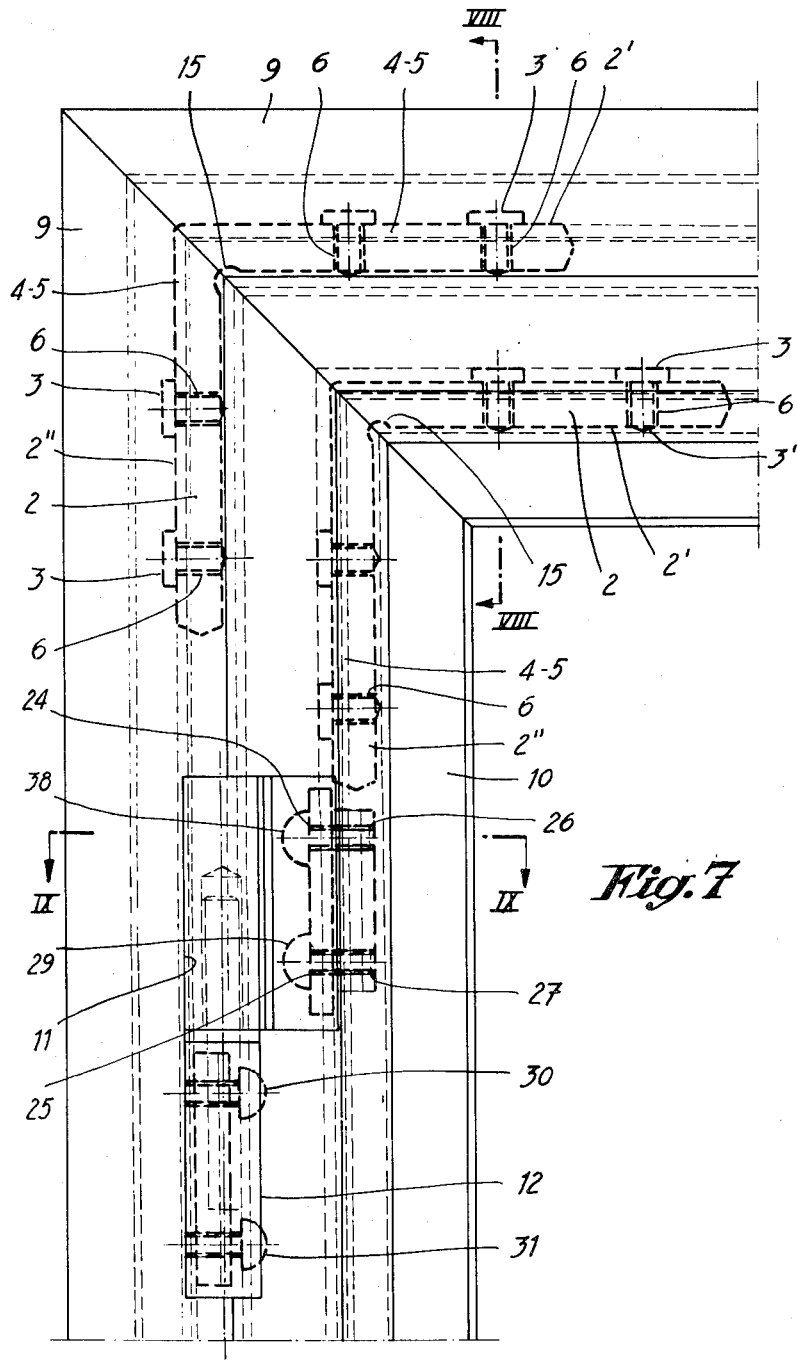
FIGURE 7 is a front view of an application of the device according to the invention used for assembling two constituent elements of a frame and for fixing separate elements onto the latter.

As shown in a most summary way in FIGURE 1, the assembling and/or fixing device according to the invention is based on a combination and cooperation of a semi-tubular channel 1, a pressure part or shoe 2 and a means for exerting pressure, embodied by the screw 3. For the purpose of applying the device according to the invention, this semi-tubular channel is characterized by the two re-entrant wings 4—5; the cross-section of the shoe 2 is such that it can engage the semi-tubular channel, and it is provided with at least one tapped screw hole 6. The pressure screw 3 engages aforesaid tapped hole 6 and bears against the bottom of the semi-tubular channel, so that, on account of the reaction caused thereby, it applies with considerable force aforesaid shoe 2 against the inner face of the re-entrant wings 4—5. Any convenient kind of screw of appropriate size and length may be used for the purpose; the screw head which takes no part in the clamping process, may either be flat, half-round, winged, hexagonal or of any other shape, whilst the free end of the screw may either be flat, spherical, conical, bevelled or otherwise. The number of such pressure shoes is widely variable and will depend on the nature of the parts to be assembled or fixed and on the required pressure stress. In some cases, this pressure shoe 2 constitutes itself the assembling element between two adjacent parts of the frame; in other cases, it may be combined with the separate part which is to be fixed onto the frame.

As shown schematically in this same FIGURE 1, aforesaid pressure screw 3 acts in direction of the arrow F whereas the reactions on the shoe 2 take place in the direction of the arrows F'.

FIGURE 2 represents summarily and schematically the application of the same means, more particularly for fixing onto the section 1 any detached part schematically represented at 7. In this particular application, the inner pressure shoe 2 is provided with one or more tapped holes 6 whereas the separate part has the same number of plain holes 8 through which the screws 3 can pass freely, corresponding holes 6 and 8 being accurately superposed. When the screws are strongly tightened, the separate part is firmly applied against the top face of the re-entrant wings by the head of the screws 3 whereby, in this case, these screws may not bear against the bottom of the channel. The detached part 7 may practically be of any shape and dimensions. The pressure shoe 2 might in this case answer the double purpose of serving as a part for assembling and for fixing.

This new assembling and/or fixing device can be systematically applied to any semi-tubular channel, either single or complex, of any design.

Cross-sections of several such channels are represented by way of example in FIGURES 3 to 6.

In each case, the semi-tubular channels 1 are provided with two re-entrant wings 4—5 against which the parts used for assembling and/or fixing must be applied with considerable force.

FIGURE 7 is a front view of the corner of a complete frame, consisting substantially of a dormant frame 9, an opening frame 10 and, between both, hinges of which one is represented in 11—12.

Figure 8:
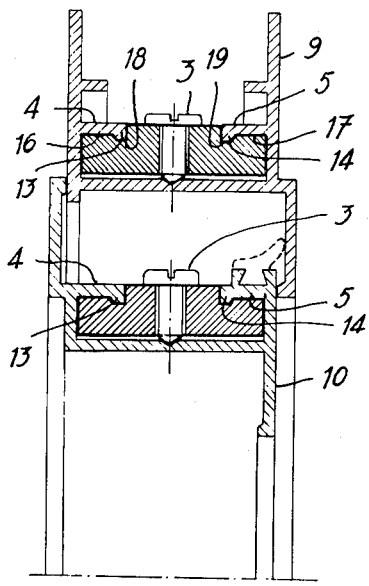
FIGURE 8 is a cross-section along line VIII—VIII of FIGURE 7.

The dormant frame 1 is put together by joining orthogonally given lengths of semi-tubular channels which, in the present instance, have a cross-section such as that represented in FIGURE 3. Here again we find the two re-entrant wings 4—5 each of which is edged by an internal rib, 13—14 respectively. The pressure shoe 2 which in this instance is used for assembling, is a part bent at right angles, with two branches 2'—2" respectively. The inner bend is hollowed-out at 15. On either side of the outer face of the pressure shoe 2, there is a jamb (see FIGURE 8), 16—17 respectively, and each jamb is provided with a groove 18—19 respectively the cross-section of which is such that aforesaid ribs 13—14 of the semi-tubular channel might exactly fit therein. Each branch 2'—2" of a aforesaid pressure shoe 2 has two tapped holes 6. Through each of these holes, there is a pressure screw 3. Thus, for assembling both lengths of channel 9 which have previously been mitered, all that has to be done is to introduce one of the branches, 2" for instance, into the semi-tubular part of one of aforesaid channels 9 and to fix it firmly therein by strongly tightening the screws 3 whose heads do not bear against the shoe. The conical end of these screws penetrates slightly into the underlying material. Thereupon, the second length of channel 9 is fitted against the first in such way that the second branch 2" of the pressure shoe 2 enters the semi-tubular part of this second length. For finishing the assembly, it will thence suffice to tighten firmly the corresponding pressure screws 3.

As can be gathered from the preceding, this method of assembling works almost instantaneously, is extremely convenient, and does require neither tracing, nor drilling, nor tapping of the section 9; differences in the position of the pressure screws 3 do not matter and all elements taking part in such an assembly can be duly prepared in the workshop.

The same procedure applies for assembling the constituent channels of the opening frame 10. In the example illustrated in FIGURE 7, this opening frame 10 is made-up of a semi-tubular channel the cross-section of which is shown in FIGURE 5. This also contains as characteristic part the two re-entrant wings 4—5 with their longitudinal ribs 13—14.

The pressure shoes 2 are similar to those used for the dormant frame 9. They therefore also comprise two branches 2'—2" disposed at right angles to each other, whereby the inner bend 15 is preferably hollowed-out. In this particular instance, each branch is provided with two tapped holes 6 into which aforesaid pressure screws 3 engage.

Figure 9:
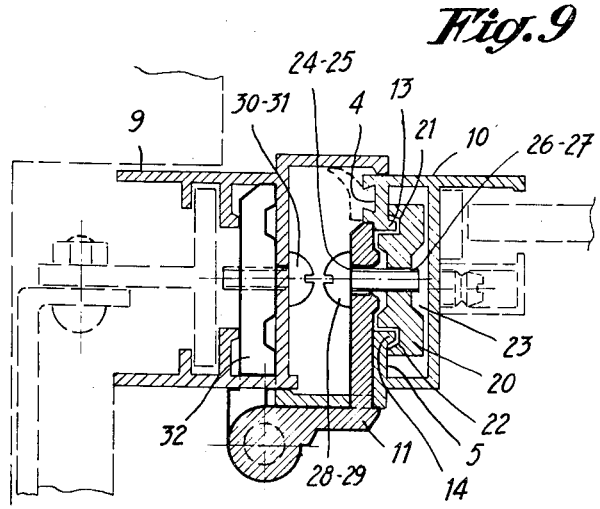
FIGURE 9 is a cross-section along line IX—IX of FIGURE 7.

By simply repeating the foregoing procedure at the three remaining corners of the intended frame, a strong frame is obtained which on the other hand, can easily be dismantled at any time. It will further be noticed, that this method of assembly is astonishingly fast and does not comprise any delicate part nor operation which could only be carried-out by highly skilled labour. In the front view of FIGURE 7 and in the section of FIGURE 9, the same clamping, respectively assembling and/or fixing means is applied to a female part 11 and a male part 12 of a hinge. The cross-section represented in FIGURE 9 shows with full detail the method used for fixing the female element 11 of the hinge. In this instance, a shaped pressure-shoe 20 provided with two longitudinal grooves 21—22 and, on its rear face, a wide central groove 23, is engaged in the semi-tubular channel 10. Aforesaid female part 11 of the hinge is provided with two plain holes 24—25 which face two identical tapped holes 26—27 of aforesaid pressure-shoe 20. Pressure screws, respectively 28—29, engaged in the corresponding tapped holes clamp the parts together. When these screws are strongly tightened, the ribs 13—14 of the wings, as well as the ribs 4—5 of the semi-tubular channel 10 engage the grooves 21—22 of the pressure-shoe 20.

It will be noticed that, both in connection with the pressure shoes 2 and with the pressure shoes 20, the cooperation of the ribs 4—5 of the re-entrant wings of the semi-tubular channels with the grooves of the shoes, contributes to the strength and the stability of the semi-tubular channels of the re-entrant wings 4—5 of which are thus permanently held against their bearings and positively secured in their correct positions. This system thus not only strengthens the assembled frames, but also protects them against unwanted distortion.

The male part 12 of the hinge can either be fastened in the same way as the female part, or, as shown schematically in FIGURES 7 and 9, the screws could be made to go in the usual way through the corresponding side of the channel 9 as well as through the part 32 inserted in the latter. If this method be adopted, the position of the opening frame 10 can be easily adjusted to a nicety by slightly displacing the elements of the hinge with respect to the corresponding frame; more particularly, in the present instance, this relative displacement with respect to the frame 10 could be applied only to the male element 11 of the hinge, by which means it would be possible to raise or to lower slightly this opening frame in order to obtain an adjustment which would be practically perfect.

Aforesaid means of assembling and/or fixing can be rationally adapted to any application whatever and it thus becomes possible, on account of the very characteristics of the extreme simplicity of the device according to the invention, to fabricate and to put on the market any amount of channels with semi-tubular section, of assembling elements and of detached parts, the whole being ready for use and the only operation needed being to cut the channels to the length required in accordance with the size of the frames and of the intended constructions.

Aforesaid frames and constructions may be applied to a wide variety of building elements, such as windows, doors, panels, walls, roof parts and frames of any description.

The present invention concerns not only the actual device as such, but also aforesaid parts made especially for applying the device in question.

What I claim is:

In combination with two frame portions extending at right angles to each other, each of said frame portions comprising at least one rail having a bottom, side walls connected with said bottom and at least two wing portions carried by said side walls, said wing portions extending toward each other and being spaced from and parallel to said bottom, whereby a channel is formed by said bottom, said side walls and said wing portions; the rail bottoms of the two frame portions being located in planes which are perpendicular to each other and joining each other in a plane extending perpendicularly to the longitudinal directions of said two frame portions, the wing portions of the two frame portions joining each other in the last-mentioned plane, whereby the channels of the two frame portions have bottoms extending in perpendicular planes and open top portions located between said wing portions and also extending in perpendicular planes, an angular pressure shoe located in said channels and having the shape of substantially an inverted T in cross-section, said pressure shoe having surfaces engaging at least some of the inner surfaces of the rails, and a plurality of screws screwed into said pressure shoe, at least one of said screws extending perpendicularly to one other screw, each of said screws having a head located outside of said pressure shoe and an integral threaded portion having an end located outside of said pressure shoe and engaging one of said rail bottoms, each of the wing portions of at least one of said rails comprises at least one longitudinal rib located upon an inner surface of the wing portion and extending toward the bottom of the rail, said pressure shoe having at least two coplanar surfaces engaging said inner surfaces of the wing portions and having grooves containing said ribs.

References Cited in the file of this patent

UNITED STATES PATENTS

| 1,791,680 | Miller | Feb. 10, 1931 |
| 2,767,609 | Cousino | Oct. 23, 1956 |

FOREIGN PATENTS

| 302,256 | Italy | Oct. 22, 1932 |